(12) United States Patent  
Ayres

(10) Patent No.: US 6,597,699 B1
(45) Date of Patent: Jul. 22, 2003

(54) QUALITY OF SERVICE MANAGEMENT IN A PACKET DATA ROUTER SYSTEM HAVING MULTIPLE VIRTUAL ROUTER INSTANCES

(75) Inventor: Lawrence Ayres, Santa Barbara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/407,712

(22) Filed: Sep. 28, 1999

(51) Int. Cl.$^7$ ............................................. H04L 12/28
(52) U.S. Cl. ....................... 370/400; 370/412; 370/469
(58) Field of Search ................................. 370/229, 230, 370/231, 232, 235, 381, 389, 395.7–395.72, 412–417

(56) References Cited

U.S. PATENT DOCUMENTS

| | | | | |
|---|---|---|---|---|
| 5,408,469 A | * | 4/1995 | Opher et al. | 370/399 |
| 5,473,599 A | | 12/1995 | Li et al. | |
| 5,493,566 A | * | 2/1996 | Ljungberg et al. | 370/231 |
| 5,513,326 A | * | 4/1996 | Nute | 710/60 |
| 6,172,963 B1 | * | 1/2001 | Larsson et al. | 370/229 |
| 6,430,179 B1 | * | 8/2002 | Meyer | 370/360 |

FOREIGN PATENT DOCUMENTS

| | | |
|---|---|---|
| EP | 0860 960 A2 | 8/1998 |
| EP | 0 926 859 A2 | 6/1999 |
| WO | WO 99/14958 | 3/1999 |

* cited by examiner

*Primary Examiner*—Hassan Kizou
*Assistant Examiner*—David Odland

(57) ABSTRACT

Methods and system for controlling the processing of data packets comprising a plurality of routers and a plurality of virtual router instances with each virtual router instance storing received data packets in one or more ingress data queues located on each router in which the virtual router instance appears. Packet flow rates of ingress data queues associated with the first virtual router instance on each of a first and second router are periodically adjusted based on current operating conditions of the first router. Packet flow rates of one or more ingress data queues may be adjusted based on current operating conditions of the first router when at least a second virtual router instance is also located on the first and second routers. Packet flow rates of the first and second virtual router instances may also be adjusted independently of each other.

10 Claims, 7 Drawing Sheets

QUALITY OF SERVICE MANAGEMENT IN A PACKET DATA ROUTER SYSTEM HAVING MULTIPLE VIRTUAL ROUTER INSTANCES

RELATED APPLICATION DATA

The present application is related to U.S. application Ser. No. entitled, "Quality Of Service Management In A Packet Data Router Having Multiple Virtual Router Instances," which was filed on the same day herewith and which is fully incorporated herein by reference for all it additionally teaches and discloses. The present application is also related to U.S. application Ser. No. entitled, "Ingress Data Queue Management In A Packet Data Router," which was filed on the same day herewith and which is fully incorporated herein by reference for all it additionally teaches and discloses.

FIELD OF INVENTION

The present invention pertains generally to the field of packet data networks and, more particularly, to system architectures and methods for regulating and managing the flow of data packets in a system of one or more packet data routers.

BACKGROUND

In a typical packet data router, packets originating from various source locations are received via a plurality of communication interfaces. Each packet contains routing information, such as a destination address, which is associated with a respective communication interface of the router, e.g., by a routing table or packet forwarding protocol. The router reads the routing information of each received packet and, if it recognizes the information, forwards the packet to the appropriate communication interface for further transmission to its destination. Packets without known destination address or forwarding protocol information are typically dropped.

Due to normal ebbs and flows in packet data traffic patterns and volume, a packet data router may be unable to immediately route newly received packets to respective designated communication interfaces. In particular, packet data traffic tends to have bursts of high activity, which is followed by lulls. Thus, a packet data router may be characterized as having a sustained data rate and a burst data rate. When receiving a burst of packet traffic, the router will temporarily store the received packets in an associated memory until t has the processing capacity available to process and forward the packets to their respective outgoing communication interface. When the sustained or burst data rates of a router are exceeded for a certain period of time, it is inevitable that further incoming packets will be dropped. Of course, while sometimes unavoidable, dropping unprocessed packets is undesirable because the source will then retransmit the dropped packet as part of its recovery procedure, which tends to prolong the congested state of the packet router and cause further unprocessed packets to be dropped.

Packet data network users often share either a single router, or router system, from a service provider. Multiple different internet users, for example, may connect via respective data modems or primary rate interface ("PRI") lines to a single internet protocol ("IP") router, or IP router system, operated by an internet service provider ("ISP"). These end users may be single customers themselves, or there may be multiple (e.g., networked) users combined as a single customer account by the ISP. Each customer account may be allocated a respective level of service priority and packet throughput bandwidth by the ISP, depending on the type and level of service connectivity that is contracted for.

For purposes of clarification, as referred to herein, a "router" is defined as a physical (as opposed to logical) entity having a defined number of physical communication interfaces (e.g., modems) under the control of one or more processors collectively executing a single control function. Typically, a single physical router operates under a single routing domain—i.e., wherein a packet received on any communication interface may be forwarded only to the same, or any other communication interface of the router. As referred to herein, a "router system" is defined as two or more independent routers, with an external controller for selectively directing common (incoming) packet data traffic to respective routers within the system.

It is known to implement within a single router one or more virtual router instances ("VRIs"). Each VRI has its own subset of communication interfaces, or logical circuits on a shared communication interface, and its own routing domain, but still under the control of a common control function with the other packet traffic handled by the router. In particular, a VRI exists as a collection of processes performed by the router, which correspond roughly to the layers in the TCP/IP protocol model. For example, a private network can be configured as a VRI, so that packet data may only be exchanged between end users on the same network. It has also been proposed to have a single VRI span multiple routers in a router system. For example, one suggested implementation is to have a dedicated interface link bridging respective communication interfaces of multiple routers having a common VRI.

Because of varying and often unpredictable growth rates, as well as other economic factors, a packet router, or packet router system, will not necessarily have the processing or memory capacity to simultaneously provide the contracted for bandwidth allocation for every user or VRI it services. Further, various users will connect to the IP router at different, often unpredictable, times and with varying rates and bandwidth needs.

An IP router is typically controlled with a real time operating system ("RTOS"), which allows multiple processes of different priorities to co-exist under the control of a common control function (e.g., within a single central processing unit). For example, the RTOS may have sensors that provide feedback information regarding current usage characteristics for a given user, which is used to adjust the RTOS operating parameters in response to changes in demand. Common applications for the RTOS are process control, motion control and, in certain applications, command and control.

The problem is that these operating systems often fail to effectively accommodate the different priority and bandwidth requirements contracted for by the end user customers of the ISP. In a motion control system, for example, the flow of information from sensors is into the system, and the flow of control signals is out of the system. There may be a lot of sensors, and there may be a lot of subsystems being controlled, but the input information does not circulate through the system and become the output. This has the effect of making the inherent control feature of the RTOS process/task priority ineffectual for controlling the system.

In particular, a typical IP router is a "packet driven" system. The more data packet it receives, the greater the load, and that load traverses the whole system such that the input is (for all practical purposes) the output. Thus, users whose connection to the router is handling the most packets will tend to monopolize the system resources.

For example, consider a router that is divided into two different VRIs, with each VRI having roughly the same number of end users and paying an ISP for the same quality of service ("QOS"), including identical priority and bandwidth requirements. Thus, the router should be able to provide the end users of each VRI with the same number of bits-per-second ("BPS") system throughput at any given time. Suppose, however, that the router processing capability is barely adequate to handle the peak load of even one of the VRIs without dropping unprocessed packets. If users of the first VRI have, in effect, tied up the router throughput processing capabilities, the users of the second VRI will not receive the service priority and bandwidth they are otherwise entitled to.

Thus, there is a need for methods and system architectures for more fairly regulating the processing of data packets through a packet data router, or router system, whereby the quality of service is balanced for each user and/or VRI, and wherein the system is kept stable, even when heavy loads occur.

SUMMARY OF THE INVENTION

In accordance with a first aspect of the invention, a method for controlling the processing of data packets is provided for a packet data router system having a plurality of routers and configured to support a plurality of virtual router instances ("VRIs"), at least one VRI appearing on multiple routers, wherein each virtual router instance storing received data packets in one or more queues located in each router in which the virtual router instance appears. Data stored in any one queue is processed by the respective router at a data processing rate associated with the respective queue.

In a preferred implementation, the method includes independently adjusting the data processing rates of one or more queues associated with a first VRI located on a first router; and the data processing rates of one or more queues associated with the first VRI located on a second router based on current operating conditions of the first or second router. By way of example, the data processing rates of one or more queues associated with the first VRI located on the first router may be decreased, while the data processing rates of the one or more queues associated with the first VRI located on the second router increased, in response to current operating conditions of the first router.

In another preferred implementation, in which first and second VRIs appear on both first and second routers, the method includes adjusting the respective data processing rates of one or more queues associated with the first and second VRIs located on both routers in response to current operating conditions of one or both routers. In particular, the data processing rates of the queues associated with the first VRI are adjusted independently of the data processing rates of the queues associated with the second VRI.

By way of example, the data processing rates of one or more queues associated with a first VRI located on a first router may be decreased, and the data processing rates of one or more queues associated with the first VRI located on a second router are increased, while at the same time the data processing rates of one or more queues associated with a second VRI located on the first router are increased, and the data processing rates of one or more ingress data queues associated with the second VRI located on the second router are decreased, respectively, in response to the same current operating conditions in the first or second router.

As will be apparent to those skilled in the art, other and further aspects and advantages of the present invention will appear hereinafter.

BRIEF DESCRIPTION OF THE DRAWINGS

Preferred embodiments of the present invention are illustrated by way of example, and not by way of limitation, in the figures of the accompanying drawings, in which like reference numerals refer to like components, and in which.

DETAILED DESCRIPTION OF THE PREFERRED EMBODIMENTS

Figure 1:
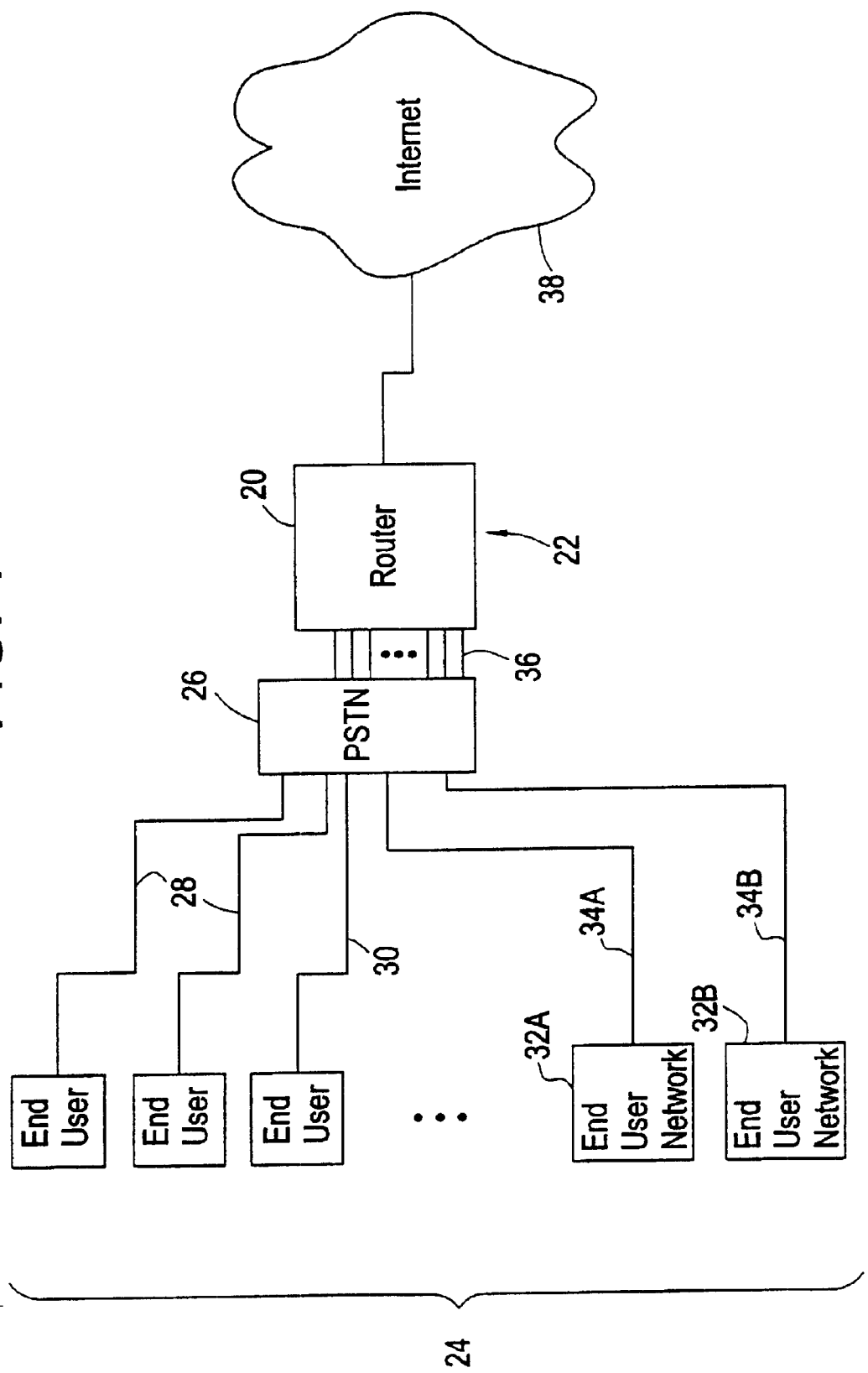
FIG. 1 is a simplified block diagram of a preferred packet data router employed as an internet gateway for multiple end users.

FIG. 1 illustrates a preferred packet data router 20 employed as an internet gateway by an internet service provider ("ISP") 22. The router 20 receives "upstream" data packets from a plurality of different end users 24. Based on routing information contained in each received data packet, the router 20 either (1) forwards the packet to a respective internet server 38; (2) forwards the packet to an end user 24 connected to the router 20; or (3) drops the packet due to it having an unknown destination address or being otherwise undeliverable. The router 20 also receives "downstream" data packets from the internet server(s) 38 and, if possible, forwards the received downstream packets to respective end users 24.

The end users 24 may comprise individuals connected to the router 20 over a traditional public switched telephone network ("PSTN") 26 via, e.g., dial-up modem connections 28, or a basic rate integrated digital services network ("ISDN") line 30. Respective end user networks 32A and 32B, each comprising a substantial number of end users 24, are connected to the router 20 via respective dedicated T1 lines 34A and 34B, which are also provided as part of the PSTN 26. From the PSTN 26, the respective communication links are forwarded via plurality of dedicated lines 36 to the router 20 at the ISP 22. Other communication links are also possible, such as, e.g., a wireless modem link (not shown), or a coaxial cable modem connection provided over a cable television network (not shown).

Figure 2:
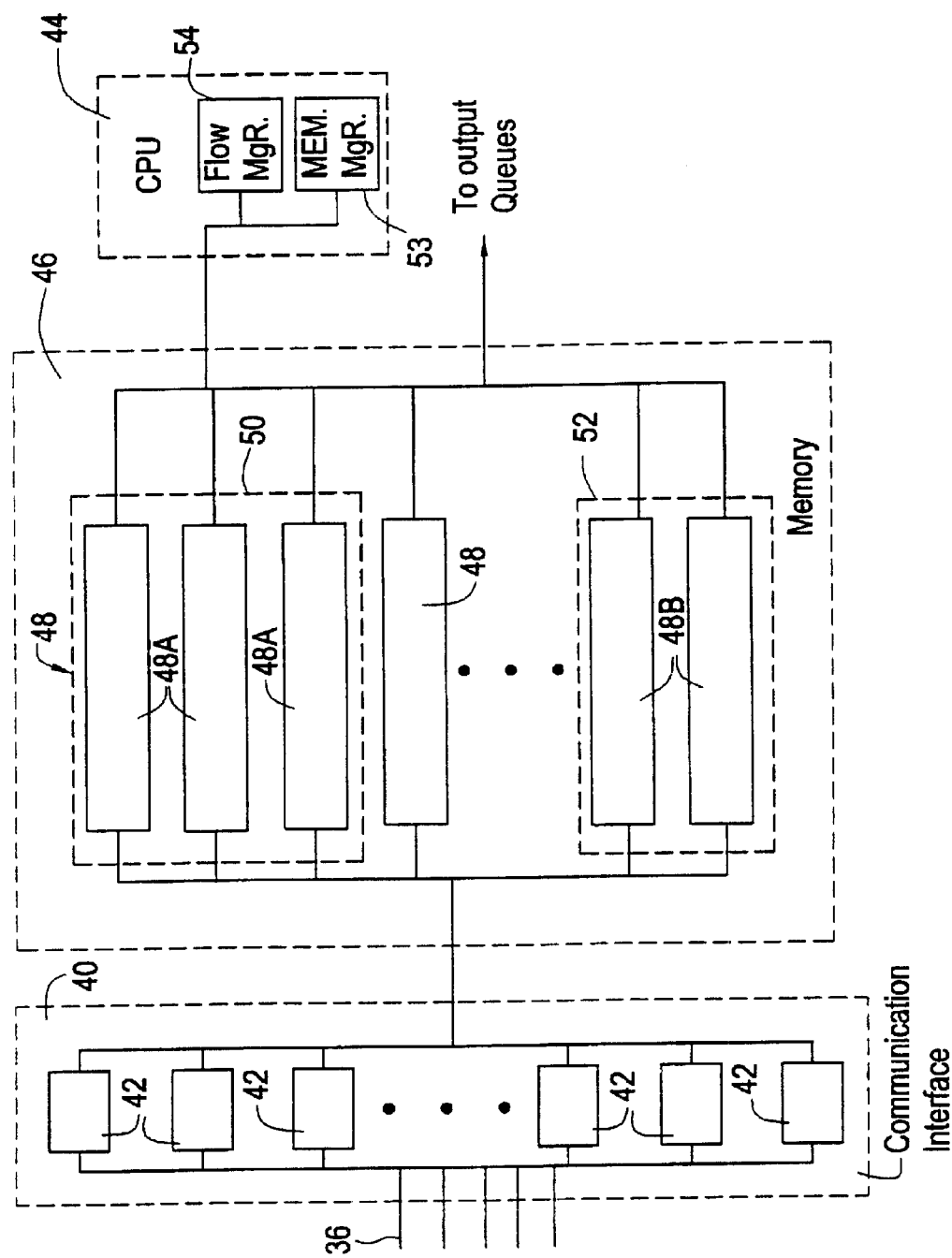
FIG. 2 is a simplified block diagram of ingress data queues stored in memory in the router of FIG. 1.

Referring to FIG. 2, the router 20 includes one or more processors collectively executing a single control function, which for ease in illustration are collectively shown in FIG.

2 and referred to herein as a single central processing unit ("CPU") 44. The router 20 also includes a shared buffer memory 46, which is preferably implemented as a dynamic random access memory ("DRAM"). At the router 20, the communication lines 36 from the PSTN 26 are terminated at a communication interface 40, comprising a plurality of a software configurable digital signal processors ("DSPs") 42. Upstream packets processed (i.e., demodulated) by the DSPs 42 are initially held in respective ingress data queues 48 formed as linked lists in the memory 46.

As will be appreciated by those skilled in the art, the ingress data queues 48 are software data structures that hold the stored packets for processing in a first-in, first-out (FIFO) fashion. The ingress data queues 48 implemented in the router 20 have the concept of "depth,"—i.e., a maximum number of stored packets that the respective queue can hold. The particular configuration of the ingress data queues 48 in the memory 46 may vary without departing from the inventive concepts taught herein. Notably, in the embodiment depicted in FIG. 2, each end user 24, networked end user group 32A/32B or VRI 50/52, may have one or more dedicated ingress data queues 48 for storing packets received by the router 20.

For example, data packets received from a first end user group 32A, and only packets received from group 32A, are stored in a first dedicated plurality of ingress data queues 48A. Likewise, data packets received from a second end user group 32B, and only packets received from group 32B, are stored in a second dedicated plurality of ingress data queues 48B. Alternatively, two or more end users 24 may share one or more ingress data queues 48, with a number of possible configurations.

In the embodiment depicted in FIG. 2, the ingress data queues 48A are implemented within the router 20 as a first VRI 50, and the ingress data queues 48B are implemented as a second VRI 52, with each VRI 50 and 52 having its own routing domain. Notably, the packet processing, or "flow rates" for VRI 50 or VRI 52 are the flow rates of the corresponding respective ingress data queues 48A and 48B.

There may be further VRIs implemented in the router 20, but only the first and second VRIs 50 and 52 are shown for ease in illustration in the inventive concepts herein. What is significant is that each VRI within the router 20 is assigned one or more manageable ingress data queues 48. In alternate preferred embodiments, the location of the manageable queues may be between VRI protocol layers, where the packet drop and delay parameters are known, instead of at the ingress points.

The CPU 44 selectively retrieves packets from the ingress data queues 48 on a FIFO basis, and forwards them to output queues (not shown) associated with the respective output destinations, or otherwise drops packets that are non-deliverable. The packets from each respective ingress data queue 48 are processed by the CPU 44 at a given "packet flow rate," which is defined generally as a number of packets processed by the CPU 44 from the respective ingress data queue 48 during a given processing interval. The packet flow rates of each ingress data queue 48 may differ and, as described in greater detail are controlled by a flow management process, or "flow manager" 53, which is a part of the RTOS of the router 20.

As will be apparent, if immediate processing by the CPU 44 of packets held in a given ingress data queue 48 is not possible, the length of the queue will increase accordingly. Of course, the memory 46 has a finite capacity for storing packets, and each ingress data queue 48 is allocated only a certain amount of buffer space in the memory 46. The number of stored packets of each ingress data queue 48 is tracked by a memory management process, or "memory manager" 53, which is a part of the RTOS of the router 20. Notably, the stored packet lengths may vary.

Generally, shared buffer memories, such as DRAMs, are well suited for use in a packet data router in that they provide relatively inexpensive, high storage capacity in a compact form. However, each read or write access into the memory 46 can be relatively time consuming because of the limited data bus bandwidth between the CPU 44 and the memory 46, as well as the inherent row address strobe latency in a DRAM (if applicable). In other words, it is relatively time and processor resource consuming for the CPU 44 to store (write) or retrieve (read) each data packet into or out of the memory 46.

Figure 3:
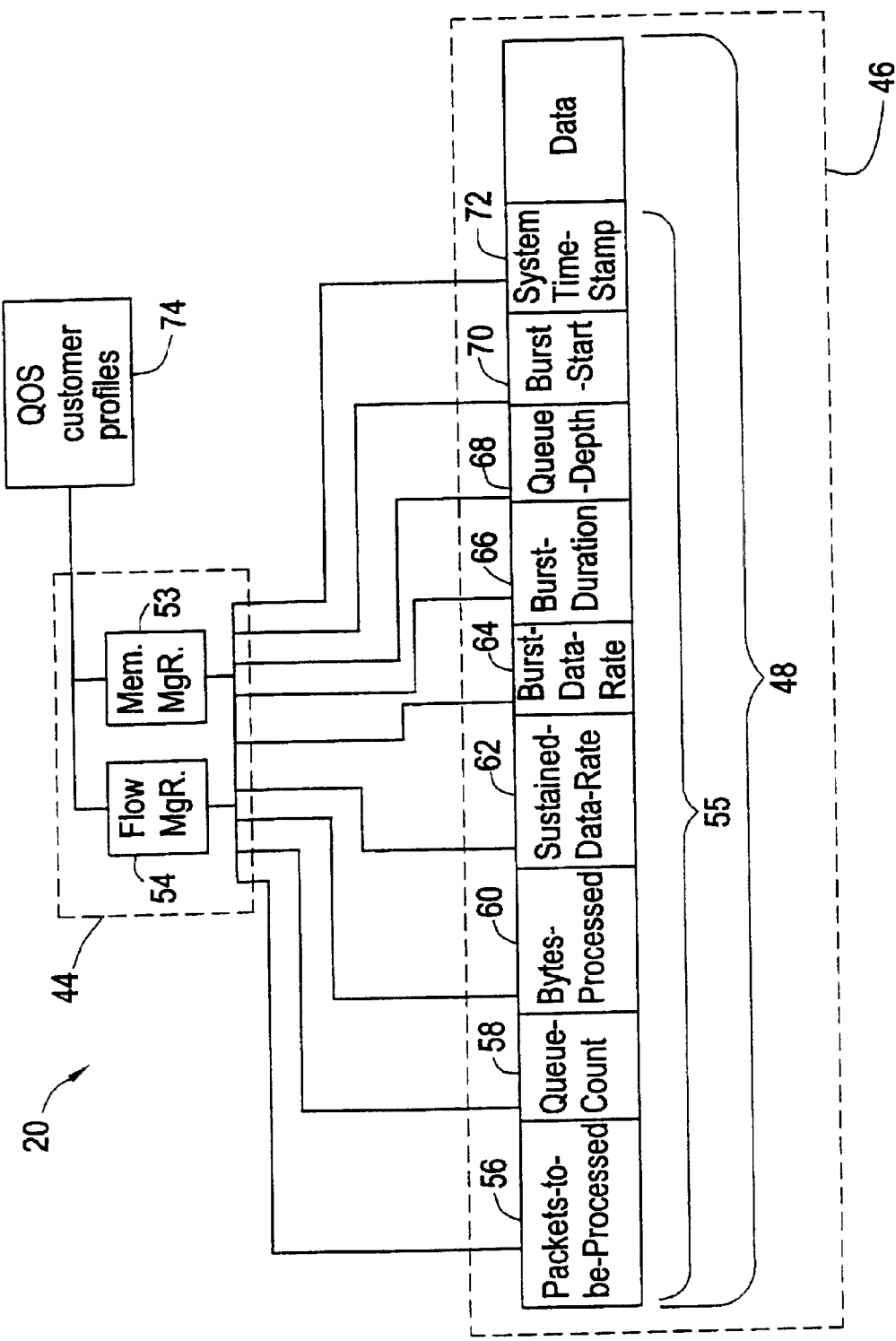
FIG. 3 is a box diagram illustration of a preferred packet flow and memory management process in the router of FIG. 1.

Referring to FIG. 3, the function of the flow manager 54 is to manage and control the data flow of the ingress data queues 48. In a presently preferred embodiment, the flow manager 54 is implemented as a system task that is repeated at a selected interval, e.g., once every second, for each ingress data queue 48. The flow manager 54 monitors the processing of data packets held in each ingress data queue 48 to manage the overall data flow through the router 20 and, in particular, utilization of the CPU 44 and memory 46.

Towards this end, the flow manager 54 maintains a data queue head structure 55 stored in the memory 46 as a header to each respective ingress data queue 48. The data queue head structure 55 includes several data fields employed by the flow manager 54 for controlling the packet flow rate and amount of memory allocated for the respective ingress data queue 48. In a preferred embodiment, the data fields in the data queue head structure 55 include:

(1) A "packets-to-be-processed" field 56 having a value indicating a number of packets held in the respective data queue 48 that are to be processed by the CPU 44 during a given processing interval.

(2) A "queue-count" field 58 having a value indicating the number of packets presently held in the respective data queue 48.

(3) A "bytes-processed" field 60 having a value indicating the number of data bytes processed from the respective data queue 48 during a present processing interval.

(4) A "sustained-data-rate" field 62 having a value, in bits per second, indicating a target maximum data processing rate for the respective data queue 48, e.g., based on a customer service agreement by the ISP 22.

(5) A "burst-data-rate" field 64 having a value, in bits per second, indicating an increased maximum data processing rate for the respective data queue 48, to be temporarily implemented upon receipt of a data burst.

(6) A "burst-duration" field 66 having a value, in seconds (or some fraction thereof, indicating a maximum duration of time for which the data rate specified in the burst-data-rate field 64 shall be maintained upon receipt of a data burst.

(7) A "queue-depth" field 68 indicating the maximum number of packets allowed to be held in the respective data queue 48 at one time—i.e., wherein any further received packets will be dropped until existing stored packets are processed to make room for more to be stored.

(8) A "burst-start" field 70 for holding a time stamp value indicating when receipt of a data burst on the respective data queue 48 has been detected.

(9) A "system-time-stamp" field 72 for holding a time stamp value indicating when a poll of the data queue head structure 54 was last performed.

As will be appreciated by those skilled in the art, the actual order of the data fields (1)–(9) is of no particular significance, and many variations are possible without departing from the inventive concepts disclosed herein.

In accordance with a general aspect of the invention, the flow and memory managers 54 and 53 constantly monitor the current operating conditions of the router 20, e.g., processor and memory utilization. The data fields (1)–(9) in each data queue head structure 55 are used by the flow and memory managers 54 and 53 to perform several tasks, including monitoring and adjusting the flow rate, managing the burst data rate and adjusting the memory allocation and usage, respectively, of each ingress data queue 48.

The flow manager 54 also monitors, e.g., as a periodic task, the respective flow rates of each ingress data queue 48 and, if appropriate, makes corresponding adjustments to the packet flow rate of one or more ingress data queues 48 in order to ensure overall system stability is maintained in a manner least impacting end user quality of service (QOS). In particular, system stability of the router 20 and, most importantly, the QOS for each user 24, user group 32A/32B and/or VRI 50/52 served by the router 20 may be best managed through control of the respective packet flow rates and proportional memory allocation of each of the individual ingress data queues 48.

For example, in accordance with a general aspect of the present invention, if processor utilization approaches or exceeds the upper end of a desired operating range, the flow manager 54 will decrease the packet flow rate of one or more ingress data queues 48 by decreasing the corresponding values of the packets-to-be processed field(s) 56. Conversely, if the processor utilization approaches or falls under the lower end of a desired operating range, the flow manager 54 may increase the packet flow rate of one or more ingress data queues 48 by increasing the corresponding values of the packets-to-be processed field(s) 56.

An advantage of controlling the processing of data packets on an ingress data queue level is that the system resources of the router 20 can be fairly distributed, or restricted, without individual end users 24, user groups 32A/32B or VRIs 50/52 being disproportionately impacted. A traditional RTOS of a router, on the other hand, cannot differentiate between end users having the same QOS, but accessing the router on different ingress data queues.

By way of illustration, suppose VRI 50 and VRI 52 have identical QOS profiles, but that at a given instance VRI 50 has only one active end user 24 on their network, while at the same instance VRI 52 has nineteen active end users 24. A traditional router RTOS system would allocate (and restrict) resources equally among the different users, i.e., with 5% of the total bandwidth to each end user 24, despite the fact that the lone end user 24 of VRI 50 should have half (50%) of the available router bandwidth, with the nineteen end users 24 of VRI 52 sharing the other half among themselves.

By being able to control the flow rates of individual ingress data queues, the present invention overcomes this drawback in the prior art. Also, individual user or VRI bandwidth guarantees (i.e., on an ingress data queue level) are possible with the present invention. Further, by controlling the data processing speed of an ingress data queue 48, an ISP 22 may enforce sub-rate bandwidth rates on high speed modems, e.g., allow a 56K modem connection for an end user whose QOS profile is only rated for 28.8K. Most importantly, independent control over the ingress data queues 48 allows for more predictability in dealing with peak traffic loads.

In accordance with this aspect of the invention, the flow manager 54 preferably adjusts the respective flow rates of the ingress data queues 48 independently of one another. Based on respective QOS profiles 74 maintained by the ISP 22, the flow manager 54 will adjust the flow rate of those ingress data queue(s) 48 that will least adversely impact QOS criteria for any one end user 24, user group 32A or 32B and/or VRI 50 or 52.

Certain aspects of each customer QOS profile are maintained in the data queue head structure 55 of each ingress data queue 48. For example, the sustained-data-rate field 62 sets forth a target maximum data processing rate for the respective ingress data queue 48, upon which the value of the packets-to-be-processed field 56 for the respective data queue 48 is calculated. In a preferred embodiment, the sustained-data-rate 62 for each ingress data queue 48 is initially determined based on the maximum allotted rate of any end user 24, user group 32A/32B or VRI 50/52 associated with the respective data queue 48. Thereafter, the sustained-data-rate 62 for each ingress data queue 48 is dynamically based on current operating conditions of the router 20. For example, the packet flow rates of one or more data queues 48A associated with VRI 50 and/or VRI 52 may be periodically adjusted in order to maintain processor utilization of the router 20 within a selected operating range.

The flow manager 54 also manages data bursts that may be received on each ingress data queue 48. The QOS user profiles 74 preferably provide for an end user 24 to be given an additional amount of packet processing bandwidth for a short period of time in order to accommodate for occasional burst packet traffic. For example, an end user 24 may need to transfer a large file once a month. Instead of having to pay for a more expensive sustained data rate bandwidth, the ISP 22 can offer the end user 24 an additional "burst data rate" for a specified duration of time (i.e., "burst duration").

In a preferred embodiment, the burst-data-rate 64 for a respective ingress data queue 48 is initially determined based on the highest maximum burst data rate guaranteed by the ISP 22 to any end user 24 associated with the respective ingress data queue 48. Similarly, the burst-duration field 66 for a respective ingress data queue 48 is initially determined based on the highest maximum burst duration guaranteed by the ISP 22 to any end user 24 associated with the respective ingress data queue 48. Thereafter, the burst-data-rate 64 and burst-duration 66 are dynamically adjusted for each ingress data queue 48 based on current operating conditions of the router 20.

Notably, the flow manager 54 may allocate differing sustained-data-rate 62, burst-data-rate 64 and burst-duration 66 values for one or more ingress data queues 48 based on off-peak usage criteria, e.g., time of day variances, but will preferably not decrease the flow rate of any ingress data queue 48 below the highest minimum rate guaranteed by the ISP 22 to any end user 24 (e.g., based on the user's QOS profile), associated with the respective ingress data queue 48, unless absolutely necessary to preserve system integrity.

Figure 4:
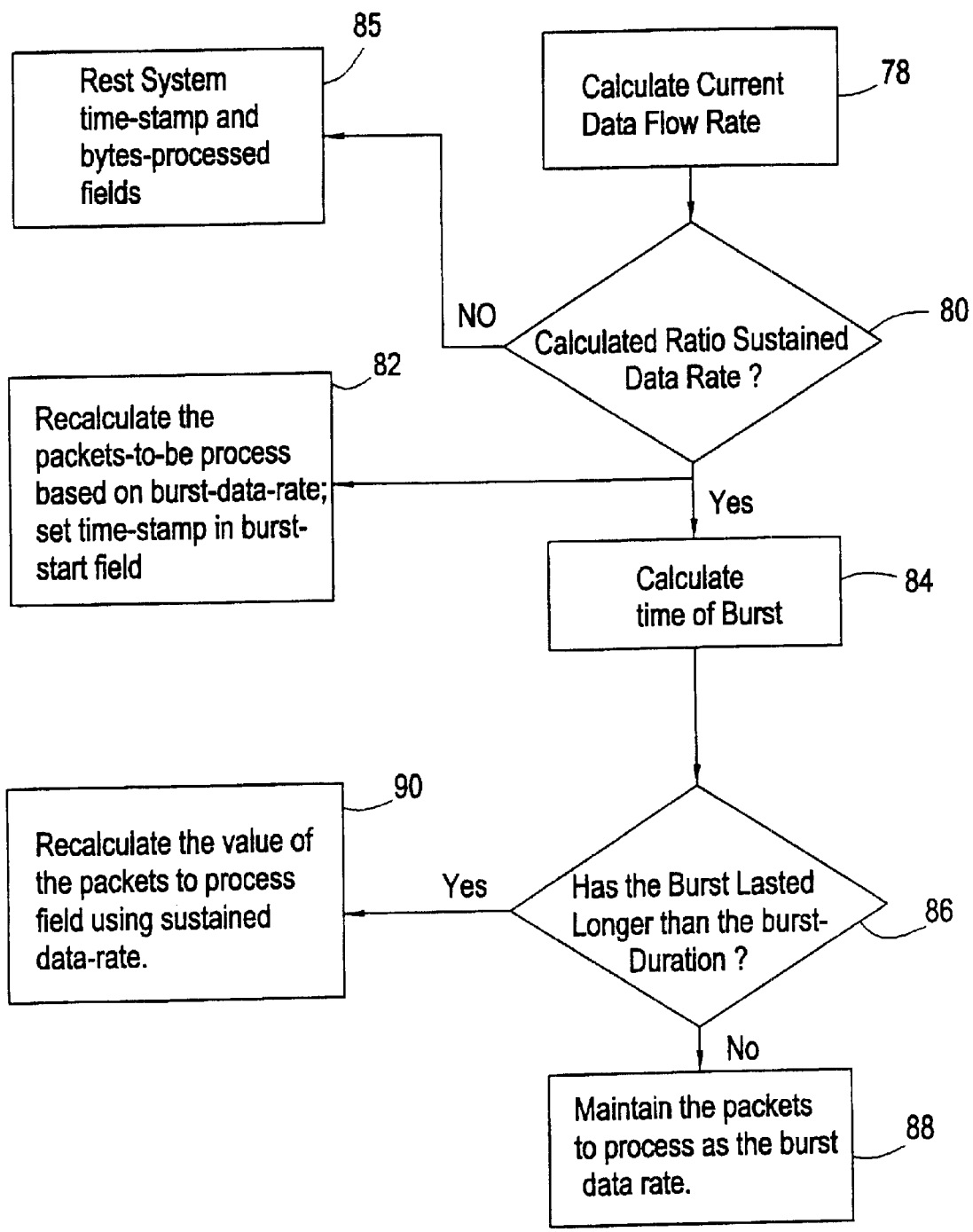
FIG. 4 is a flow chart illustrating a preferred method employed in the router of FIG. 1 to detect and adjust for a received packet data burst on an ingress data queue.

FIG. 4 depicts one preferred process by which the flow manager 54 detects whether a data burst is being received on a respective ingress data queue 48. The flow manager 54 periodically polling each ingress data queue 48 and calculating (at step 78) its current data flow rate 78 (in bits per second). In a preferred embodiment, the flow manager 54 calculates the current flow rate by multiplying the value of the bytes-processed field 60 of the data head queue structure 55 for the respective ingress data queue 48 by eight. The resultant product is then divided by the difference between the current time and the value of the system time-stamp field 72. The flow manager 54 then compares (at step 80) the calculated current packet flow rate with the value in the sustained-data-rate field 62.

If the calculated rate is greater than the sustained-data-rate, the flow manager 54 assumes a data burst is occurring on the respective ingress data queue 48. The flow manager 54 then recalculates (at step 82) the value of the packets-to-be-processed field 56 based on the value of the burst-data-rate field 64, and places a time stamp with the present time in the burst-start field 70. If no received burst is detected,—i.e., if the calculated data rate is equal to or less than the sustained-data-rate field 62,—the flow manager 54 (at step 85) updates the system time stamp field 72 and resets the value of the bytes-processed filed 60 for the next polling cycle.

If a data burst is detected on an ingress data queue 48, the flow manager 54 periodically calculates (at step 84) the duration of the data burst by calculating the difference between the present time and the time stamp in the burst-start field 70. The flow manager then compares (at step 86) the calculated burst duration with the value in the burst-duration field 66.

If the duration of a present data burst is less than the value of the burst-duration field 66, the flow manager maintains (at step 88) the value of the packets-to-be-processed field 56 based on the value of the burst-data-rate field 64. If the duration of the burst has lasted longer than the value of the burst-duration field 66, the flow manager 54 recalculates the value of the packets-to-be-processed field 56 based on the value of the sustained-data-rate field 62.

In a preferred embodiment, the values of the burst-data-rate field 64 and the burst-duration field 66 may be adjusted by the flow manager 54 based on current operating conditions in the router. By way of example, as a customer service benefit, the ISP 22 may configure the flow manager 54 to increase the values of the burst-data-rate field 64 and the burst-duration field 66 so long as the processor utilization of the router 20 is at or below a specified operating range.

With reference back to FIG. 3, the memory manager 53 monitors the respective queue-count and queue-depth fields 58 and 68 for each ingress data queue 48 as part of the memory management process. If overall utilization of the router memory 46 approaches or exceeds the upper end of a desired range, the memory manager 53 will decrease the amount of memory allocated for one or more ingress data queues 48 by decreasing the values of the corresponding queue-depth field(s) 68. Conversely, if utilization of the memory 46 approaches or falls under the lower end of a desired range, the memory manager 54 may increase the amount of memory allocated for one or more ingress data queues 48 by increasing the corresponding values of the queue-depth field(s) 68. In a preferred embodiment, the memory manager 53 increases the queue-depth field 68 of an ingress data queue 48 upon detecting a received data burst. In doing so, it may be necessary to simultaneously decreasing the queue-depth fields 68 of one or more other ingress data queues 48 in order to maintain memory utilization.

As with the packet flow rates, the amount of memory allocated for storing packets in each ingress data queue 48 is preferably determined independently of the memory allocated for all other queues 48. In a preferred embodiment, the queue-depth field 68 is initially determined based on the collective maximum amount of memory allotted for every end user 24, user group 32A/32B and/or VRI 50/52 associated with the respective data queue 48. Thereafter, the queue-depth field 68 for each ingress data queue 48 is dynamically based on current operating conditions of the router 20. For example, the queue-depth fields 68 of one or more data queues 48A associated with VRI 50 and/or VRI 52 may be periodically adjusted in order to maintain utilization of the memory 46 within a selected range.

The memory manager 53 will adjust the queue-depth fields 68 of those ingress data queue(s) 48 that will least adversely impact QOS criteria for any one end user 24, user group 32A or 32B and/or VRI 50 or 52, e.g., based on respective QOS profiles 74 maintained by the ISP 22. Preferably, the memory manager 53 will not decrease the queue-depth field 68 of any ingress data queue 48 below the highest minimum rate guaranteed by the ISP 22 to the collective end users 24, user groups 32A/32B and/or VRIs 50/52 associated with the respective data queue 48.

The operating processes making up the respective memory manager 53 and flow manager 54 are preferably linked to improve the management tools available for the router 20. For example, if processor resources are available, the flow manager 54 will decrease the packet flow rate(s) of one or more ingress data queues 48,—i.e., to increase the processing rate of the stored packet back load,—in order to decrease memory utilization. In fact, if possible, it may be preferred from a QOS point of view to temporarily increase the packet flow rates of those ingress data queues 48 having the highest queue-count fields 58, rather than reduce the queue-depth fields 68, in order to avoid or minimize dropped packets.

Figure 5:
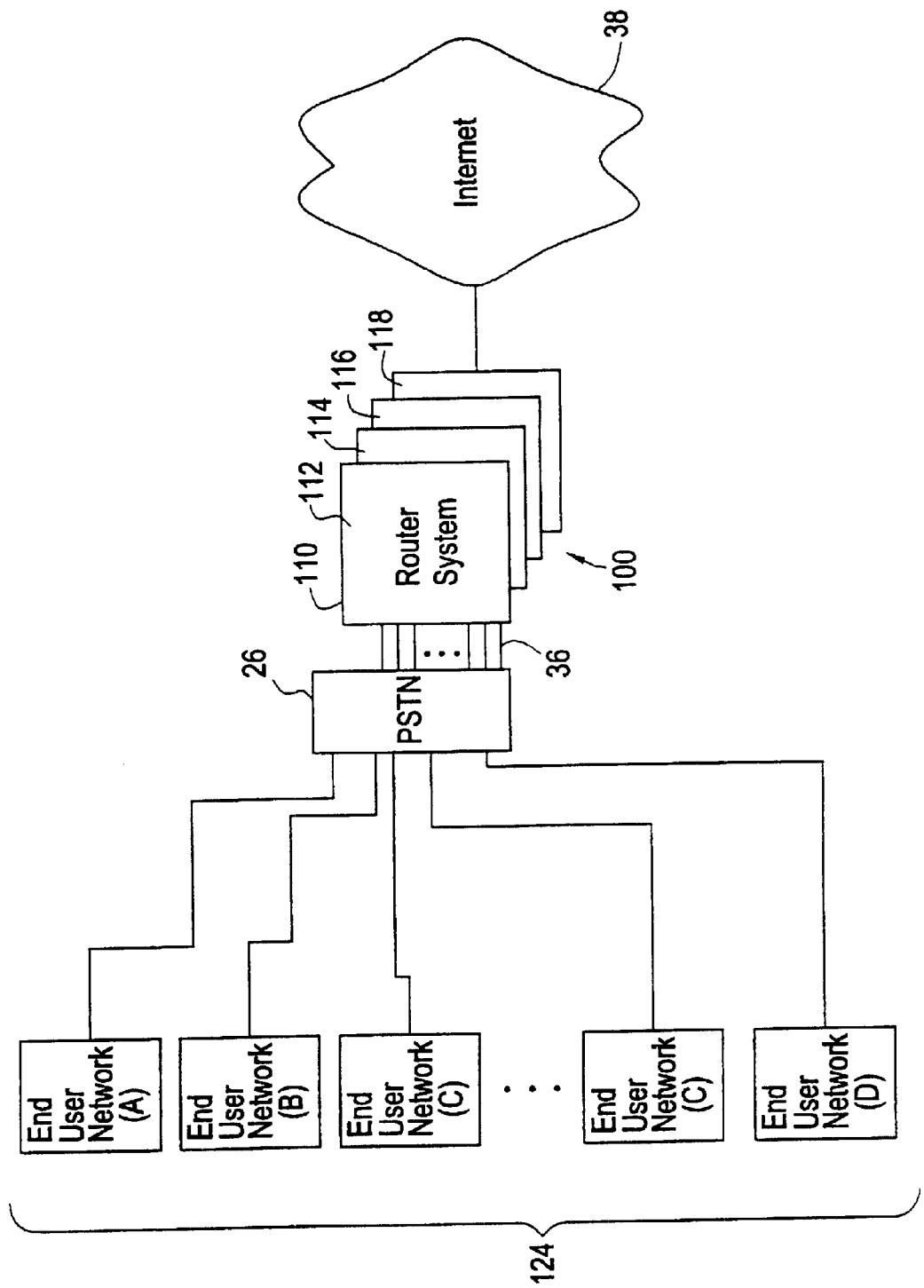
FIG. 5 is a simplified block diagram of a preferred packet data router system employed as an internet gateway for multiple customer networks.

FIG. 5 illustrates an alternate preferred packet data router system 110 employed as an internet gateway by an ISP 100. The router system 110 includes a plurality of routers 112, 114, 116 and 118, which receive and process data packets from a plurality of different end user networks 124, via the PSTN 26. Based on routing information contained in each received data packet, the router system 110 either forwards the packet to a respective internet server 38; forwards the packet to an end user network 124; or drops the packet due to it having an unknown destination address or being otherwise undeliverable. The router system 110 also receives "downstream" data packets from the internet server(s) 38 and, if possible, forwards the received downstream packets to respective end user networks 124.

The end user networks 124 include at least three distinct customer accounts, 124(A), 124(B) and 124(C). The router system 110 may have numerous other end users and customer accounts, including both individuals and networks. However, only the networks 124(A), 124(B) and 124(C) are shown for ease in illustration of still further aspects of the invention.

Figure 6:
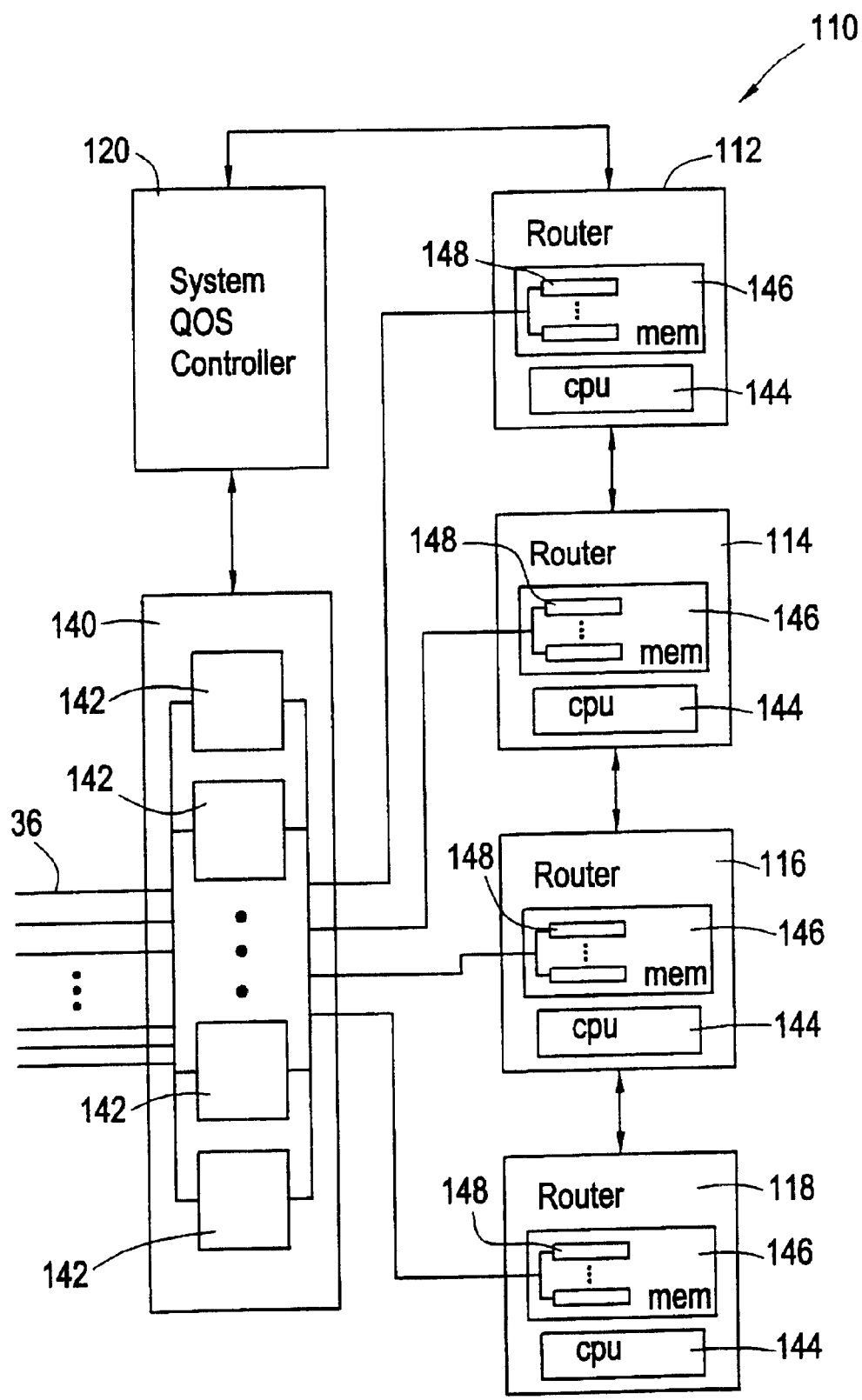
FIG. 6 is a further simplified block diagram of the router system of FIG. 5, illustrating the distribution of incoming upstream packets to respective routers of the system.

Referring to FIG. 6, each router 112, 114, 116 and 118 of the router system 110 is configured substantially identical to router 20. Each router 112, 114, 116 and 118 has one or more processors collectively executing a single control function, which for ease in illustration are collectively shown and referred to herein as a single CPU 144. Each router 112, 114, 116 and 118 also includes a shared buffer memory 146, which is preferably implemented as a DRAM.

In the illustrated preferred embodiment, the communication lines 36 from the PSTN 26 are terminated at a system communication interface 140, comprising a plurality of a software configurable DSPs 142. In an alternate preferred embodiment, one or more of the individual routers 112, 114, 116 and 118 have their own respective communication interfaces, with at least one interface connection to each of the other respective routers in order to allow for shifting incoming packet traffic.

Upstream packets processed by the DSPs 142 are initially held in respective ingress data queues 148 formed as linked lists in the respective memories 146 of each of the routers 112, 114, 116 and 118. As with the above described ingress data queues 48 in router 20, the ingress data queues 148 of the respective routers 112, 114, 116 and 118 of the router system 110 are software data structures that hold the stored packets for processing in a FIFO fashion, each queue 148 having a respective depth,—i.e., a maximum number of stored packets that the respective queue can hold. As will be described in greater detail herein, the router system 110 includes a system QOS controller 120, which monitors the operating conditions of the respective routers 112, 114, 116 and 118, and dynamically controls how the upstream packet data traffic is distributed to the various respective ingress data queues 148

Figure 7:
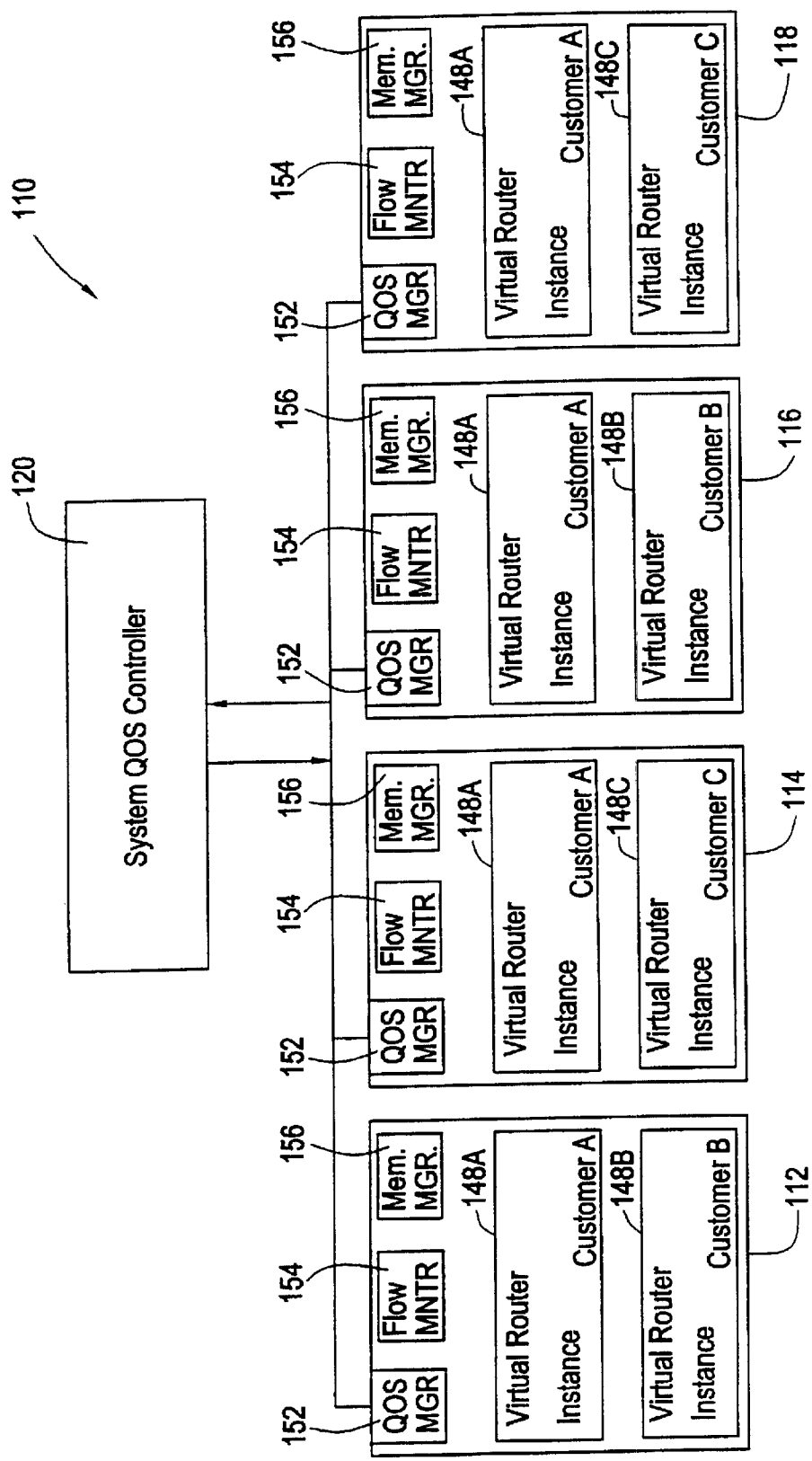
FIG. 7 is a box diagram illustration of a preferred packet flow and memory control process in the router system of FIG. 5.

Referring to FIG. 7, one or more of the ingress data queues 148A in each of the routers 112, 114, 116 and 118 are implemented as a first VRI for customer A ("VRI-A"); one or more of the ingress data queues 148B in routers 112 and 116 are implemented as a second VRI for customer B ("VRI-B"); and one or more of the ingress data queues 148C in routers 114 and 118 are implemented as a third VRI for customer C ("VRI-C"). Each VRI has its own routing domain within the respective routers that it appears on. Each router 112, 114, 116 and 118 may have one or more further VRIs, but only VRI-A, VRI-B and VRI-C are shown for simplification.

Each router 112, 114, 116 and 118 of the system 110 includes a QOS manager 152, flow manager 154 and memory manager 156, which are all part of the RTOS of the respective router. The QOS manager 152 is the control interface between the respective flow and memory managers 154 and 156 of each router 112, 114, 116 and 118, and the system QOS controller 120. As with the flow and memory managers 54 and 53 in router 20, the respective memory and flow managers 154 and 156 in each of the routers 112, 114, 116 and 118 manages and controls the data flow of the ingress data queues 148 of the respective router. In a presently preferred embodiment, the flow and memory managers 154 and 156 are implemented as system task that is repeated at a selected interval, e.g., once every second, for each ingress data queue 148 of the respective router 112, 114, 116 and 118.

In particular, the respective flow and memory managers 154 and 156 monitor the processing of data packets held in each ingress data queue 148 to manage the overall data flow through the router and, in particular, utilization of the respective routers' CPU 144 and memory 146. The respective flow and memory managers 154 and 156 monitor and maintain a data queue head structure for each ingress data queue 148 of each respective router 112, 114, 116 and 118, including, at least, each of the same fields as in the data queue head structure 55 of router 20. Thus, as with router 20, each router 112, 114, 116 and 118 of the router system 110 has the ability to control the individually control the packet flow rate and allocated memory of each ingress data queue 148. Further, the system QOS controller 120, in conjunction with each of the router QOS managers 152, has the ability to shift incoming packet traffic between respective ingress data queues 148 of the respective routers 112, 114, 116 and 118, based on operating conditions of any one router.

For example, in accordance with one further aspect of the invention, the data processing rates of one or more ingress data queues 148 associated with VRI-A on one or more the routers 112, 114, 116 and 118 are adjusted based on current operating conditions of router 112. Preferably, the data processing rates of the respective one or more ingress data queues 148 associated with VRI-A of each respective router 112, 114, 116 and 118 are adjusted independently of the processing rates of the respective one or more ingress data queues 148 associated with VRI-A located on the other routers. In addition to adjusting the flow rates of the individual data queues, the system QOS controller 120 may reallocate incoming packet traffic between ingress data queues 148 associated with any one VRI in order to better balance the system load.

While preferred embodiments and applications of the present invention have been shown and described, as would be apparent to those skilled in the art, many modifications and applications are possible without departing from the inventive concepts herein. Thus, the scope of the disclosed invention is not to be restricted except in accordance with the appended claims.

What is claimed:

1. A method for controlling the processing of data in a system comprising a plurality of routers and a plurality of virtual router instances, at least a first virtual router instance appearing on both a first router and a second router, each virtual router instance storing received data in one or more respective data queues located on each router in which the virtual router instance appears, wherein data stored in any one data queue is processed by the respective router at a data processing rate associated with the respective data queue, the method comprising:

adjusting the data processing rates of one or more ingress data queues associated with the first virtual router instance on each of the first and second routers based on current operating conditions of the first router, wherein the data processing rates of the one or more ingress data queues associated with the first virtual router instance located on the first router are decreased, the data processing rates of the one or more ingress data queues associated with the first virtual router instance located on the second router are increased, the data processing rates of the one or more ingress data queues associated with the second virtual router instance located on the first router are increased, and the data processing rates of the one or more ingress data queues associated with the second virtual router instance located on the second router are decreased, respectively, in response to the same current operating conditions of the first router.

2. The method of claim 1, wherein the data processing rates of the respective one or more ingress data queues located on the first router are adjusted independently of the data processing rates of the respective one or more ingress data queues located on the second router.

3. The method of claim 1, a second virtual router instance appearing on both the first and second routers, further comprising adjusting the data processing rates of one or more ingress data queues associated with the second virtual router instance on each of the first and second routers based on current operating conditions of the first router.

4. The method of claim 3, wherein the data processing rates of the data queues associated with the first virtual router are adjusted independently of the data processing rates of data queues associated with the second virtual router instance.

5. A method for controlling the processing of data packets in a system having a plurality of routers and a plurality of virtual router instances, each router having one or more processors executing a common control function and having a processor utilization, each virtual router instance storing received data packets in one or more respective data queues of each router in which the virtual router instance appears, wherein packets held in any one data queue are processed by the respective router at a packet flow rate associated with the respective data queue, the method comprising:

adjusting the incoming packet flow rates of the respective data queues associated with one or more virtual router instances to maintain the processor utilization of one or more routers within a selected range, wherein the packet flow rates of the one or more ingress data queues associated with the first virtual router instance located on the first router are decreased, the packet flow rates of the one or more ingress data queues associated with the first virtual router instance located on the second router are increased, the packet flow rates of the one or more ingress data queues associated with the second virtual router instance located on the first router are increased, and the packet flow rates of the one or more ingress data queues associated with the second virtual router instance located on the second router are decreased, respectively, in response to the same current operating conditions of the first router.

6. The method of claim 5, wherein the packet flow rates of the respective data queues associated with each virtual router instance are adjusted independently of the packet flow rates of the data queues associated with the other virtual router instances.

7. A method for controlling the processing of data packets in a system having a plurality of routers and a plurality of virtual router instances, each router having an associated memory, each virtual router instance storing received data packets in one or more respective data queues of each router in which the virtual router instance appears, with packets held in any one data queue being processed by the respective router at a packet flow rate associated with the respective data queue, the method comprising:

adjusting the incoming packet flow rates of the data queues associated with one or more virtual router instances to maintain utilization of one or more router memories within a selected range, wherein the packet flow rates of the one or more ingress data queues associated with the first virtual router instance located on the first router are decreased, the packet flow rates of the one or more ingress data queues associated with the first virtual router instance located on the second router are increased, the packet flow rates of the one or more ingress data queues associated with the second virtual router instance located on the first router are increased, and the packet flow rates of the one or more ingress data queues associated with the second virtual router instance located on the second router are decreased, respectively, in response to the same current operating conditions of the first router.

8. The method of claim 7, wherein the packet flow rates of the ingress data queues associated with each virtual router instance are adjusted independently of the packet flow rates of the ingress data queues associated with the other virtual router instances.

9. The method of claim 7, each data queue having a portion of the respective router memory allocated to it for storing received data packets further comprising periodically adjusting the portion of the respective router memory allocated for one or more ingress data queues associated with at least one virtual router instance.

10. The method of claim 9, wherein the respective portions of the router memory allocated for the one or more ingress data queues associated with each virtual router instance are adjusted independently of one another.

* * * * *